(12) United States Patent
Luo et al.

(10) Patent No.: US 9,985,928 B2
(45) Date of Patent: May 29, 2018

(54) DYNAMIC LINK AGGREGATION

(71) Applicant: Hangzhou H3C Technologies Co., Ltd., Hangzhou (CN)

(72) Inventors: Zhonghai Luo, Beijing (CN); Chao Lv, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days. days.

(21) Appl. No.: 14/899,781

(22) PCT Filed: Sep. 28, 2014

(86) PCT No.: PCT/CN2014/087646
§ 371 (c)(1),
(2) Date: Dec. 18, 2015

(87) PCT Pub. No.: WO2015/043517
PCT Pub. Date: Apr. 2, 2015

(65) Prior Publication Data
US 2016/0212094 A1 Jul. 21, 2016

(30) Foreign Application Priority Data
Sep. 27, 2013 (CN) .......................... 2013 1 0452895

(51) Int. Cl.
*H04L 12/28* (2006.01)
*H04L 12/56* (2006.01)
(Continued)

(52) U.S. Cl.
CPC ........ *H04L 61/2069* (2013.01); *H04L 12/467* (2013.01); *H04L 45/245* (2013.01)

(58) Field of Classification Search
CPC .. H04L 61/2069; H04L 45/245; H04L 12/467
(Continued)

(56) References Cited

U.S. PATENT DOCUMENTS 8,051,211 B2    11/2011  Finn
9,769,058 B2 *   9/2017  Holness .................. H04L 45/22
(Continued)

FOREIGN PATENT DOCUMENTS

CN    1354576       6/2002
CN    1996925 A     7/2007
(Continued)

OTHER PUBLICATIONS

"VLAN Tag-Based Quality of Service", Cisco Systems, Inc., Jun. 15, 1999.
(Continued)

*Primary Examiner* — Chuong T Ho
(74) *Attorney, Agent, or Firm* — DEQI Intellectual Property Law Corporation

(57) ABSTRACT

At least two Ethernet sub-interfaces are established on a first Ethernet interface and a second Ethernet interface of a first device, and each Ethernet sub-interface is assigned to a VLAN. The Ethernet sub-interfaces on the same Ethernet interface are assigned to different VLANs, and Ethernet sub-interfaces of the first Ethernet interface and the second Ethernet interface which belong to the same VLAN are added into a link-aggregation group to establish an aggregated link with a second device.

15 Claims, 7 Drawing Sheets

(51) Int. Cl.
*H04L 29/12* (2006.01)
*H04L 12/46* (2006.01)
*H04L 12/709* (2013.01)

(58) Field of Classification Search
USPC ................................. 370/389, 392, 216–225
See application file for complete search history.

(56) References Cited

U.S. PATENT DOCUMENTS

| | | |
|---|---|---|
| 2007/0280258 A1 | 12/2007 | Rajagopalan et al. |
| 2009/0003206 A1 | 1/2009 | Bitar |
| 2011/0051602 A1 | 3/2011 | Matthews et al. |
| 2011/0267941 A1* | 11/2011 | Bitar .................. H04L 41/0896 370/225 |
| 2012/0147737 A1* | 6/2012 | Taylor ................ H04L 41/0663 370/219 |
| 2013/0148546 A1 | 6/2013 | Eisenhauer et al. |
| 2013/0286823 A1* | 10/2013 | Taylor ................ H04L 41/0663 370/228 |
| 2014/0341012 A1* | 11/2014 | Holness .............. H04L 41/0659 370/225 |
| 2015/0023368 A1* | 1/2015 | Connolly ............ H04L 12/6402 370/420 |

FOREIGN PATENT DOCUMENTS

| | | |
|---|---|---|
| CN | 101369934 | 2/2009 |
| CN | 101843045 A | 9/2010 |
| CN | 102158421 | 8/2011 |
| CN | 102821022 | 12/2012 |
| EP | 1713215 | 10/2006 |
| EP | 2086178 | 8/2009 |
| EP | 2378724 | 10/2011 |

OTHER PUBLICATIONS

International Search Report and Written Opinion dated Dec. 31, 2014, PCT Patent Application No. PCT/CN2014/087646 dated Sep. 28, 2014, The State Intellectual Property Office, P.R. China.

* cited by examiner

DYNAMIC LINK AGGREGATION

CLAIM FOR PRIORITY

The present application is a national stage filing under 35 U.S.C. § 371 of PCT application number PCT/CN2014/087646, having an international filing date of Sep. 28, 2014, which claims priority to Chinese patent application number 201310452895.8, having a filing date of Sep. 27, 2013, the disclosures of which are hereby incorporated by reference in their entireties.

BACKGROUND

In general cases, reliability of networks is typically provided by way of link backup, i.e., there are a plurality of links between two devices, where one of the links is taken as a main link, and other links are taken as backup links. In normal cases, packets between those two devices are transferred using the main link. When the main link's failure occurs, the service data flow will be switched to one of the backup links to ensure normal operation of services.

With development of Ethernet technologies and increase of network traffic, there are more and more cases in which a Wide Area Network (WAN) uses Ethernet links. In order to increase reliability and stability of networks, an Ethernet link aggregation technology is proposed. Ethernet link aggregation is named as Link Aggregation (LA) for short, by which a plurality of Ethernet physical links are bundled into one logical link so as to increase link bandwidth. Meanwhile, those links bundle together may effectively improve link reliability by dynamic backup between each other. Using the technology of LA to aggregate a plurality of Ethernet links between two devices into one logical link may not only improve bandwidth utilization by load sharing among the plurality of Ethernet links, but also ensure convergence reliability after a single link fails.

Here, the WAN is used to realize interconnections among Local Area Networks (LANs) or Metropolitan Area Networks (MANs) in different areas. Devices in the WAN may include transmission devices such as a router and etc.

BRIEF DESCRIPTION OF THE DRAWINGS

FIGS. 6-1 and 6-2 is a structural schematic diagram of an apparatus of dynamic link aggregation according to one example of the present disclosure; and FIGS. 7-1 and 7-2 is another structural schematic diagram of an apparatus of dynamic link aggregation according to one example of the present disclosure.

DETAILED DESCRIPTION

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Figure 1:
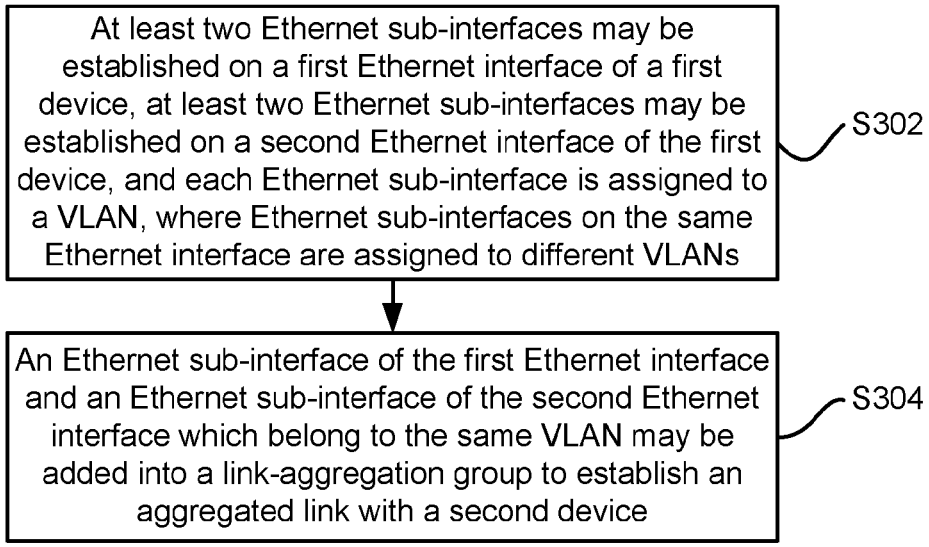
FIG. 1 is a flow chart of a method of dynamic link aggregation according to one example of the present disclosure.

As shown in FIG. 1, a method of dynamic link aggregation applied to a first device that has at least two Ethernet interfaces according to one example of the present disclosure includes the following processes:

In Block S302, at least two Ethernet sub-interfaces may be established on a first Ethernet interface of the first device, at least two Ethernet sub-interfaces may be established on a second Ethernet interface of the first device, and each Ethernet sub-interface is assigned to a Virtual Local Area Network (VLAN), where Ethernet sub-interfaces on the same Ethernet interface are assigned to different VLANs.

In one example, a routing device may act as an aggregation device. For each Ethernet interface of the routing device, a plurality of Ethernet sub-interfaces may be established on the Ethernet interface, and each Ethernet sub-interface is assigned to a VLAN.

In Block S304, an Ethernet sub-interface of the first Ethernet interface and an Ethernet sub-interface of the second Ethernet interface which belong to the same VLAN may be added into a link-aggregation group to establish an aggregated link with a second device.

For example, the second device may be an access device, or an aggregation device, or other devices, which is not limited in the present disclosure.

Through Block S304, the Ethernet sub-interfaces corresponding to the same VLAN on a plurality of Ethernet interfaces may be added to one link-aggregation group, where the Ethernet sub-interfaces added into the link-aggregation group are respectively located on different Ethernet interfaces.

Assuming that there are S Ethernet interfaces on the device, one Ethernet sub-interface corresponding to VLAN M may be established on each Ethernet interfaces, Ethernet sub-interfaces corresponding to VLAN M of S Ethernet interfaces may be added into one link-aggregation group, or Ethernet sub-interfaces corresponding to VLAN M of X (X<S) Ethernet interfaces may be added into one link-aggregation group. Here, Ethernet sub-interfaces may be established on all or a part of the Ethernet interfaces.

An aggregated link may be established for the Ethernet sub-interfaces on different Ethernet interfaces in the same link-aggregation group with the same peer device which is a device other than the local device, and is located at the opposite end of the aggregated link. For instance in the example above the first device is the local device and the second device is a peer device of the first device. Likewise, aggregated links may be established for one Ethernet interface with a plurality of peer devices through different Ethernet sub-interfaces in different link-aggregation groups.

It is possible to establish an aggregated link across transmission devices between the local device and a peer device.

By the technical solution provided in the above example, a plurality of Ethernet sub-interfaces may be established on an Ethernet interface, and each Ethernet sub-interface is assigned to a VLAN, and the Ethernet sub-interfaces on a plurality of Ethernet interfaces which belong to the same VLAN may be added to one link-aggregation group. Because a plurality of Ethernet sub-interfaces may be established on the Ethernet interface while each Ethernet sub-interface may be added into one link-aggregation group, more link-aggregation groups may be established using a smaller number of Ethernet interfaces, so that by way of dynamic link aggregation, it is possible to use a smaller number of Ethernet interfaces on the device to establish aggregated links with more peer devices.

Figure 2:
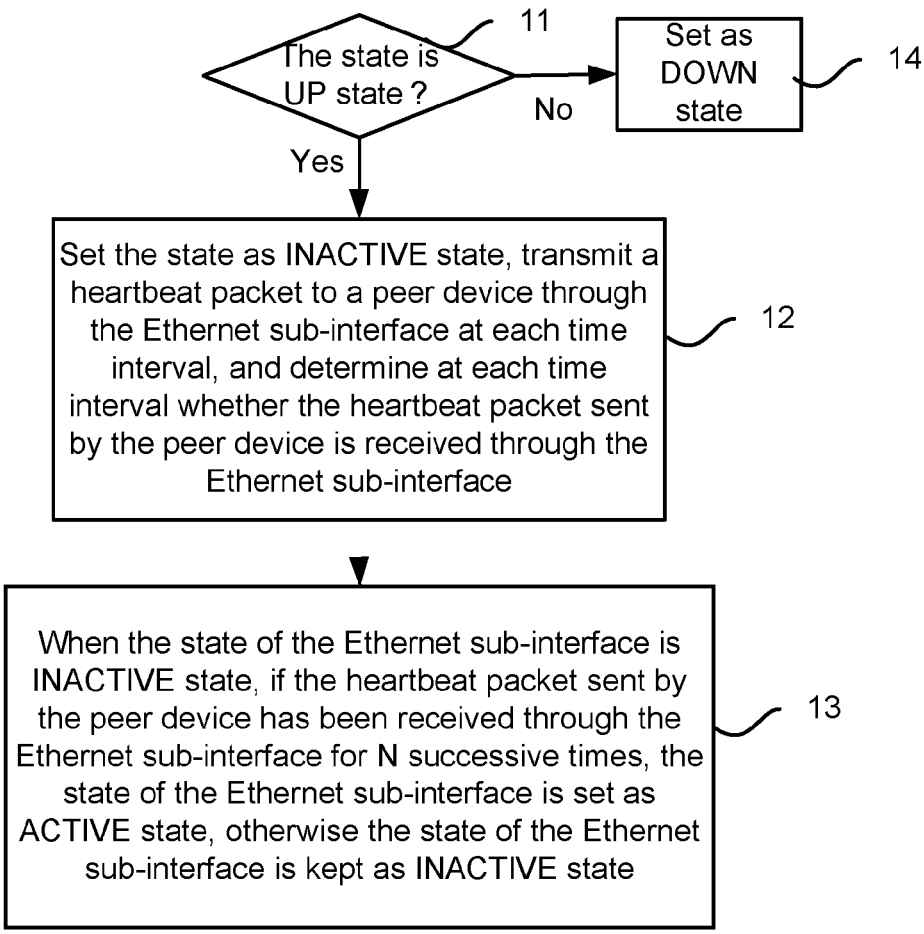
FIG. 2 is a flow chart of a method for adding Ethernet sub-interfaces with the same VLAN of at least two Ethernet interfaces into one link-aggregation group to establish an aggregated link with a second device according to one example of the present disclosure.

In Block S304, the process of adding the Ethernet sub-interface of the first Ethernet interface and the Ethernet sub-interface of the second Ethernet interface which belong to the same VLAN into the link-aggregation group to establish the aggregated link with the second device may be as shown in FIG. 2, where for an Ethernet sub-interface in the link-aggregation group, the following Blocks 11-14 may be performed.

In Block 11, it is determined whether the Ethernet sub-interface is in an UP state (i.e., in an usable state). If it is in the UP state, Block 12 is to be performed, and otherwise, Block 14 is to be performed.

In Block 12, the state of the Ethernet sub-interface is set as an INACTIVE state, a heartbeat packet is transmitted to a second device periodically through the Ethernet sub-interface at each pre-determined time interval, and it is determined periodically whether a heartbeat packet transmitted by the second device is received through the Ethernet sub-interface at each pre-determined time interval.

The heartbeat packet transmitted by one Ethernet sub-interface may carry a VLAN ID of the VLAN corresponding to the Ethernet sub-interface.

In Block 13, when the Ethernet sub-interface is in an INACTIVE state, if the first device has received the heartbeat packet transmitted by the second device through the Ethernet sub-interface for N successive times, the state of the Ethernet sub-interface is set as an ACTIVE state, and otherwise, the Ethernet sub-interface is kept in the INACTIVE state. Herein, N is a pre-determined value.

Subsequently, when the state of the Ethernet sub-interface is in the ACTIVE state, if the first device has not received the heartbeat packet transmitted by the second device through the Ethernet sub-interface for N successive times, the state of the Ethernet sub-interface is set as the INACTIVE state, and otherwise the Ethernet sub-interface is kept in the ACTIVE state; and when the Ethernet sub-interface is in the INACTIVE state, if the local device has received the heartbeat packet transmitted by the second device through the Ethernet sub-interface for N successive times, the state of the Ethernet sub-interface is set as the ACTIVE state, and otherwise the Ethernet sub-interface is kept in the INACTIVE state.

In practical implementation, when the way of dynamic aggregation is adopted, in one example, link detection may be made for links using a Link Aggregation Control Protocol (LACP) packet as the heartbeat packet. For one link, both the local device and the peer device may periodically transmit to the counterpart a LACP packet (referred to as the heartbeat packet) for link detection, and may periodically detect whether the heartbeat packet transmitted by the counterpart is received, so that they may determine whether a link failure occurs based on detection results.

In Block 14, the state of the Ethernet sub-interface is set as a DOWN state (i.e., an unusable state).

An Ethernet sub-interface may have three states: the DOWN state, the ACTIVE state and the INACTIVE state. An Ethernet sub-interface in the ACTIVE state is able to forward data packets, such as service packets or etc., while an Ethernet sub-interface in the INACTIVE state only transmits and receives LACP packets, and an Ethernet sub-interface in the DOWN state does not transmit or receive any packets.

By the heartbeat packets, it may keep alive of heartbeat and detect link failure for each Ethernet sub-interface in the link-aggregation group so that it may normally converge when a link fails.

Furthermore, when a data packet is transmitted to the second device, dependent on relevant information in a packet header of the data packet and using a pre-determined aggregation algorithm, the first device will select one Ethernet sub-interface from the Ethernet sub-interfaces in the ACTIVE state in the link-aggregation group to transmit the data packet, where the data packet may be a service packet or etc.

The aforementioned relevant information may be at least one of a source Media Access Control (MAC) address, a target MAC address, a source IP address, a target IP address and etc. In particular, Hash computation is made for the aforementioned relevant information to obtain one value (denoted as KEY). If the total number of the Ethernet sub-interfaces in the ACTIVE state in the link-aggregation group is equal to M, the value of KEY % M (denoted as S) is calculated, where S ranges from 0, 1, . . . , (M−1), so that based on the value of S, it can be determined which one is the Ethernet sub-interface to be selected. For example, when S=0, the selected Ethernet sub-interface is the one which is the first to be in the ACTIVE state in the link-aggregation group; when S=1, the selected Ethernet sub-interface is the one which is the second to be in ACTIVE state in the link-aggregation group, and so on. In other words, based on the value of S, the relative location in the link-aggregation group for the Ethernet sub-interface to be selected may be determined.

Figure 3:
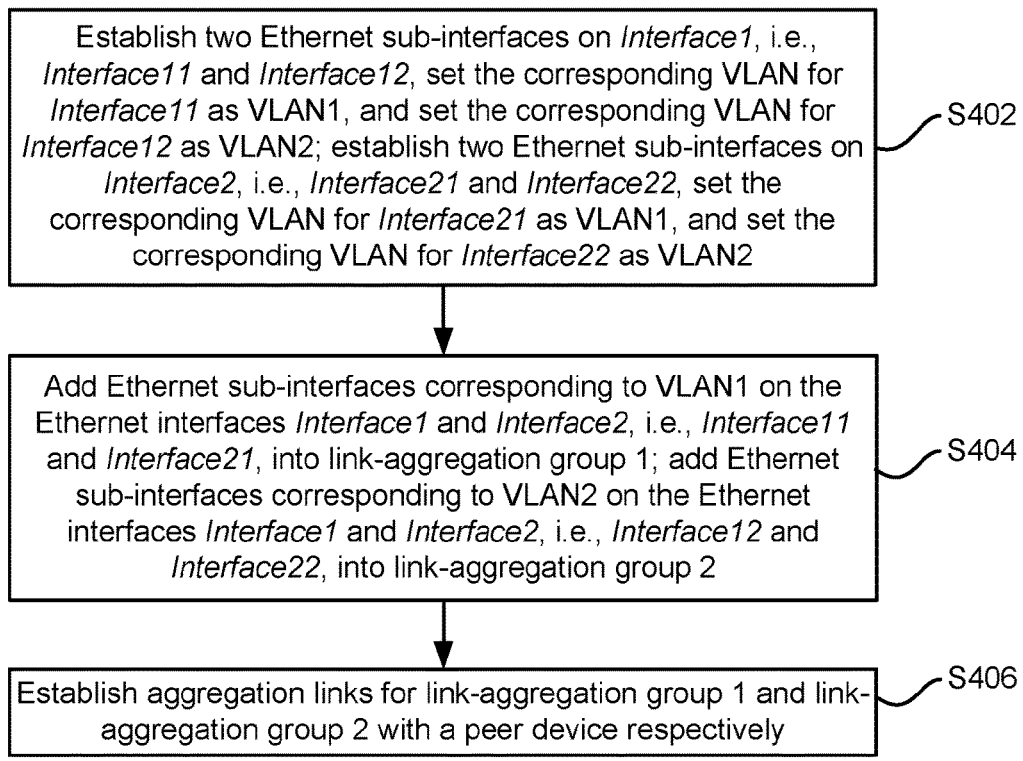
FIG. 3 is a flow chart of a method of dynamic link aggregation according to one example of the present disclosure.
Figure 4:
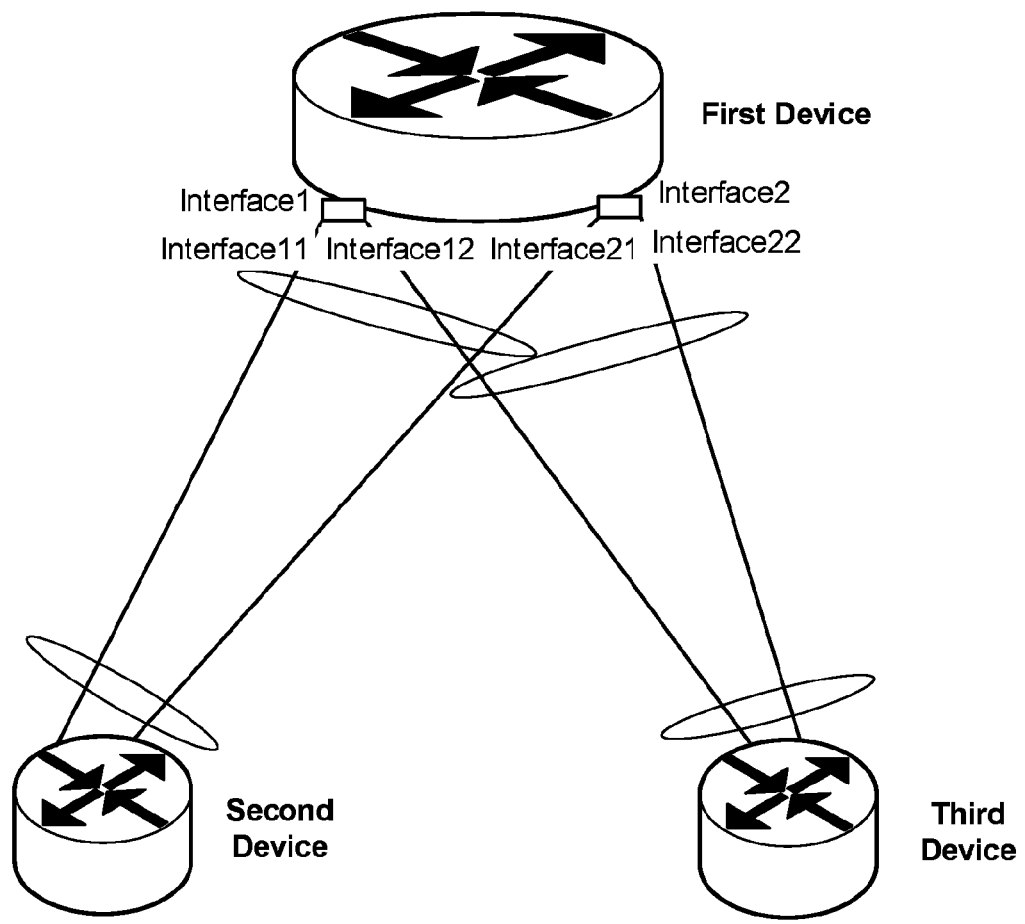
FIG. 4 is a diagram illustrating the aggregated links between an aggregation device and two access devices according to one example of the present disclosure.

In one example, as shown in FIG. 4, the dynamic link aggregation technology is employed on a first device which may for example be an aggregation layer device. In FIG. 4 it can be seen that the first device has a first Ethernet interface Interface1 and a second Ethernet interface Interface2. As shown in FIG. 3, an aggregation processing method performed by the aggregation device includes the following processes:

In Block S402, two Ethernet sub-interfaces Interface11 and Interface12 are established on the first Ethernet interface Interface1. The corresponding VLAN for Ethernet sub-interface Interface11 is set as VLAN1, and the corresponding VLAN for Ethernet sub-interface Interface12 is set as VLAN2. Likewise, two Ethernet sub-interfaces are established on Ethernet interface Interface2, i.e., Interface21 and Interface22, and the corresponding VLAN for Ethernet sub-interface Interface21 is set as VLAN1, and the corresponding VLAN for Ethernet sub-interface Interface22 is set as VLAN2.

In Block S404, as shown in FIG. 4, on the Ethernet interfaces Interface1 and Interface2, the Ethernet sub-interfaces corresponding to VLAN1, i.e., Interface11 and Interface21, are added into a link-aggregation group (this link-aggregation group is denoted as link-aggregation group 1);

likewise, on the Ethernet interfaces Interface1 and Interface2, the Ethernet sub-interfaces corresponding to VLAN2, i.e., Interface12 and Interface22, are added into a link-aggregation group (this link-aggregation group is denoted as link-aggregation group 2). Thus Ethernet sub-interfaces which belong to the same VLAN but are located on different Ethernet interfaces are aggregated into a link aggregation group.

Thus, as shown in FIG. 4, in logical, the Ethernet sub-interfaces, i.e., Interface11 and Interface21, are added into link-aggregation group 1; and the Ethernet sub-interfaces, i.e., Interface12 and Interface22, are added into link-aggregation group 2.

In Block S406, aggregated links are established for link-aggregation group 1 with a second device and link-aggregation group 2 with a third device. The second and third devices may be referred to as peer devices of the first device. In one example the second and third devices may be access layer devices.

Figure 5:
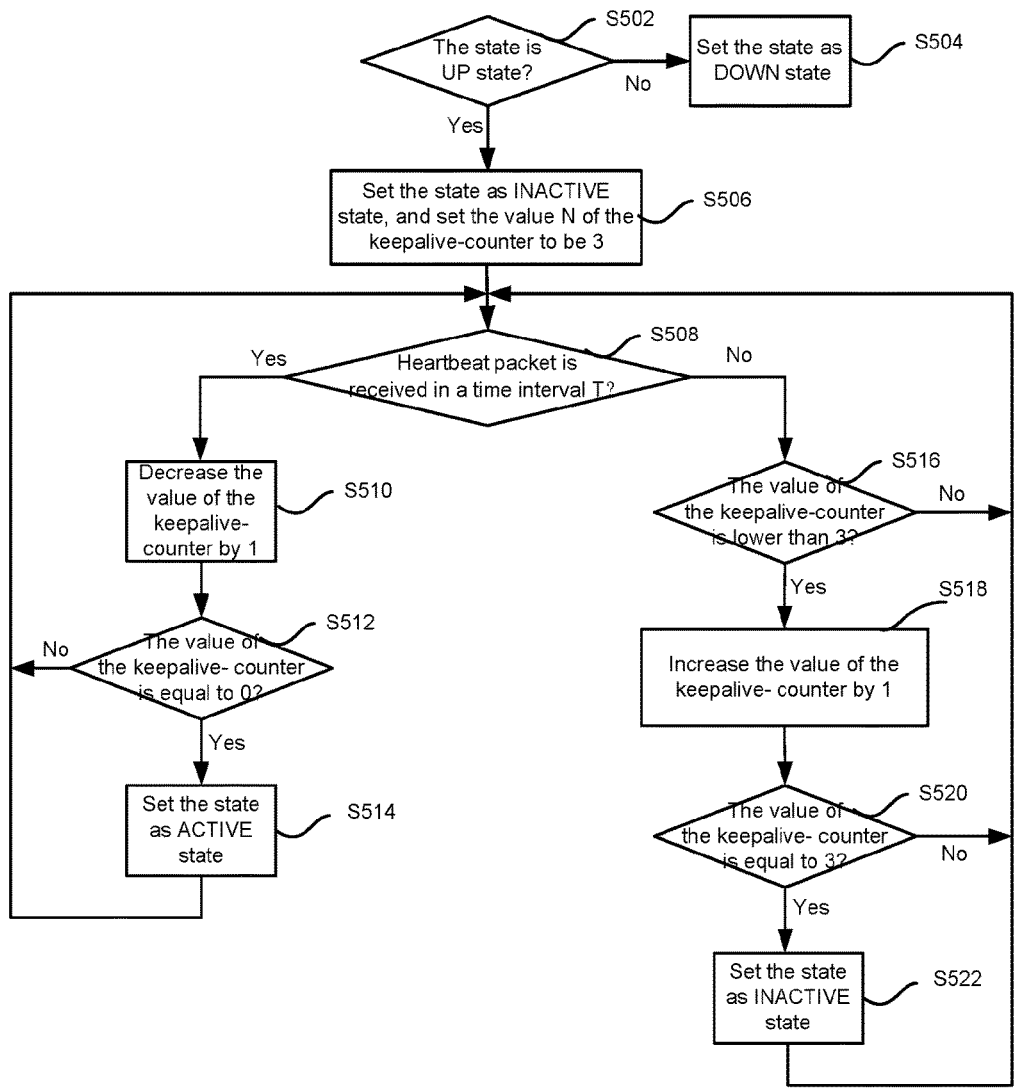
FIG. 5 is a flow chart of a method for establishing an aggregated link for a link-aggregation group with a second device according to one example of the present disclosure.

In one example, as shown in FIG. 5, a method for establishing aggregated links for a link-aggregation group with the second device in Block S406 includes:

In Block S502, for each Ethernet sub-interface in the link-aggregation group, it is determined whether the Ethernet sub-interface is in the UP state. If it is in the UP state, Block S506 is to be performed; and otherwise, Block S504 is to be performed.

In Block S504, the state of the Ethernet sub-interface is set as the DOWN state.

In Block S506, the state of the Ethernet sub-interface is set as the INACTIVE state, and with a period of T, the local device periodically transmits a heartbeat packet to a second device through the Ethernet sub-interface, and at the same time with the period of T, periodically determines whether a heartbeat packet transmitted by the second device is received through the Ethernet sub-interface. In one example, the local device sets value N of a keepalive-counter to be 3.

In Block S508, it is determined whether the heartbeat packet is received within a time interval T. If yes, Block S510 is to be performed; and otherwise, Block S516 is to be performed.

In Block S510, the value of the keepalive-counter is decreased by 1, and Block S512 is to be performed.

In Block S512, it is determined whether the value of the keepalive-counter is equal to 0. If yes, Block S514 is to be performed; and otherwise, Block S508 is to be performed.

In Block S514, the state of the Ethernet sub-interface is set as the ACTIVE state, and Block S508 is to be performed.

The Ethernet sub-interface in the ACTIVE state is able to transmit and receive service packets;

In Block S516, it is determined whether the value of the keepalive-counter is less than 3. If yes, Block S518 is to be performed; and otherwise, Block S508 is to be performed.

In Block S518, the value of the keepalive-counter is increased by 1, and Block S520 is to be performed.

In Block S520, it is determined whether the value of the keepalive-counter is equal to 3. If yes, Block S522 is to be performed; and otherwise, Block S508 is to be performed.

In Block S522, the state of the Ethernet sub-interface is set as the INACTIVE state, and Block S508 is to be performed.

The Ethernet sub-interface in the INACTIVE state does not transmit and receive service packets, but it transmits and receives heartbeat packets.

In one example, an apparatus of dynamic link aggregation is provided.

Figures 1, 6:
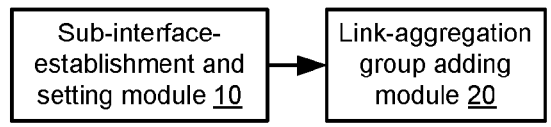
Figures 2, 6:
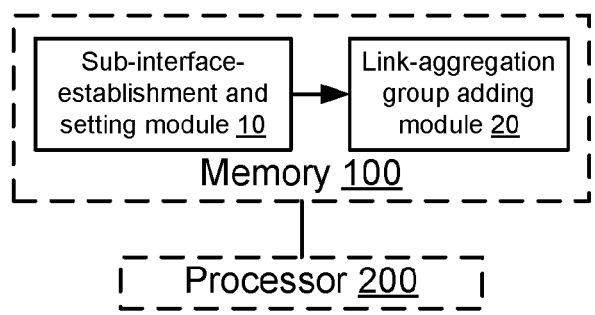

As shown in FIG. 6-1, the apparatus may include the following modules: a sub-interface establishment and setting module 10 and an link-aggregation group adding module 20. The apparatus may be a device having at least two Ethernet interfaces; for instance the first device in the above examples.

The sub-interface establishment and setting module 10 may be to establish at least two Ethernet sub-interfaces on a first Ethernet interface of the first device and at least two Ethernet sub-interfaces on a second Ethernet interface of the first device, assign each Ethernet sub-interface to a VLAN, where Ethernet sub-interfaces on the same Ethernet interface are assigned to different VLANs.

The link-aggregation group adding module 20 may be to add an Ethernet sub-interface of the first Ethernet interface and an Ethernet sub-interface of the second Ethernet interface which belong to the same VLAN into a link-aggregation group to establish an aggregated link with a second device.

The link-aggregation group adding module 20 may include a determination unit, a transmit-receive unit and a state setting unit.

The determination unit may be to, for each Ethernet sub-interface added into the link-aggregation group, determine whether the Ethernet sub-interface is in the UP state.

The transmit-receive unit may be to, if the determination unit determines that the Ethernet sub-interface is in the UP state, transmit a heartbeat packet to a second device periodically through the Ethernet sub-interface at each pre-determined time interval, and periodically determine at each pre-determined time interval whether a heartbeat packet transmitted by the second device is received through the Ethernet sub-interface.

The state setting unit may be to, if the determination unit determines that the Ethernet sub-interface is in the UP state, set the state of the Ethernet sub-interface as the INACTIVE state; and if the determination unit determines that the Ethernet sub-interface is not in the UP state, set the state of the Ethernet sub-interface as the DOWN state; and when the Ethernet sub-interface is in the INACTIVE state, if the transmit-receive unit has received the heartbeat packet transmitted by the second device through the Ethernet sub-interface for N successive times, set the state of the Ethernet sub-interface as the ACTIVE state, where N is a pre-determined value.

In addition, the state setting unit may be further to, if the Ethernet sub-interface is in the ACTIVE state, if the transmit-receive unit has not received the heartbeat packet transmitted by the second device through the Ethernet sub-interface for N successive times, set the state of the Ethernet sub-interface as the INACTIVE state, and otherwise keep the state of the Ethernet sub-interface in the ACTIVE state, where the heartbeat packet is an LACP packet.

The apparatus as shown in FIG. 6-1 may be loaded in a device that has at least two Ethernet interfaces as shown in FIG. 6-2 which includes a memory 100 and a processor 200. The memory 100 may be a non-transitory storage medium coupled to the processor 200, and the non-transitory storage medium stores machine-readable instructions executable by the processor 200. As shown in FIG. 6-2, the memory 100 stores instruction modules executable by the processor 200, and the instruction modules may include the aforementioned sub-interface establishment and setting module 10 and the link-aggregation group adding module 20. The processor 200 may enable the above functions of each of the modules 10 and 20 by executing the instructions of each of the modules 10 and 20 in the memory 100. When the instructions in the memory 100 are executed, the processor 200 may perform processes of the method described in the above examples.

Figures 1, 7:
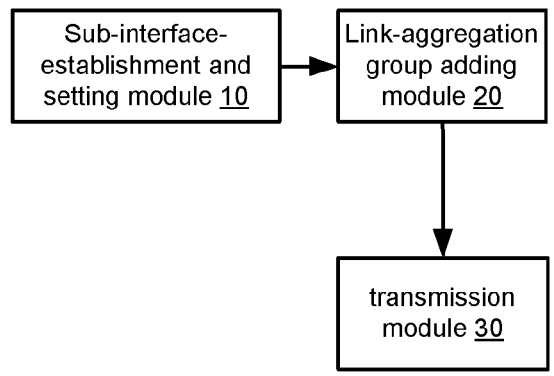
Figures 2, 7:
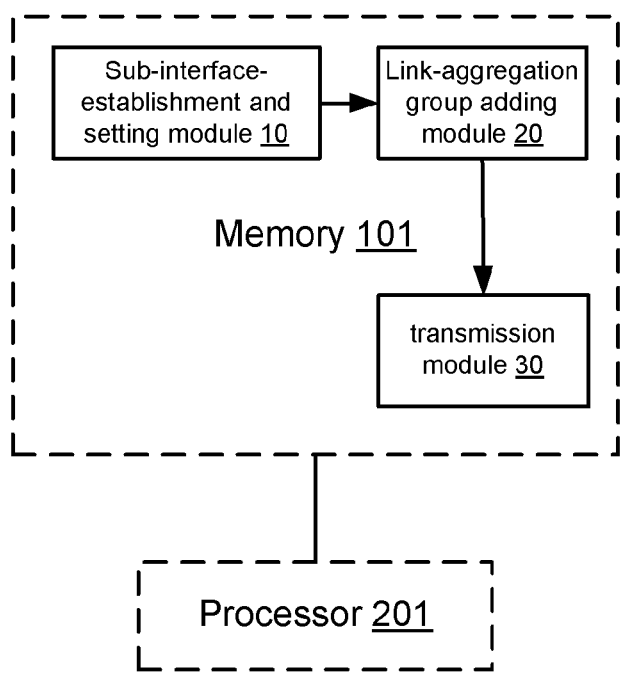

In addition, as shown in FIG. 7-1, the apparatus may further include a transmission module 30 to, when transmitting the data packet to the second device, dependent on relevant information in a packet header of the data packet and using a pre-determined aggregation algorithm, select one Ethernet sub-interface from the Ethernet sub-interfaces in the ACTIVE state in the link-aggregation group to transmit the data packet. Herein, the data packet may be the service packet or etc.

The Ethernet sub-interfaces added into the link-aggregation group may be the Ethernet sub-interfaces with the same VLAN of partial or all of the at least two Ethernet interfaces.

The aggregated link may be established through transmission devices between the local device and the second device.

The apparatus as shown in FIG. 7-1 may be loaded in a device that has at least two Ethernet interfaces as shown in FIG. 7-2 which includes a memory 101 and a processor 201. The memory 100 may be a non-transitory storage medium coupled to the processor 200, and the non-transitory storage medium stores machine-readable instructions executable by the processor 200. As shown in FIG. 7-2, the memory 101 stores instruction modules executable by the processor 201, and the instruction modules may include the aforementioned sub-interface establishment and setting module 10, the link-aggregation group adding module 20 and the transmission module 30. The processor 201 may enable the above functions of each of the modules 10, 20 and 30 by executing the instructions of each of the modules 10, 20 and 30 in the memory 101. When the instructions in the memory 101 are executed, the processor 201 may perform processes of the method described in the above examples.

To sum up, the above examples of the present disclosure may achieve the following effects:

A plurality of Ethernet sub-interfaces are established on an Ethernet interface, and each Ethernet sub-interface is assigned to a VLAN, and the Ethernet sub-interfaces on a plurality of Ethernet interfaces which belong to the same VLAN are added to one link-aggregation group. Because multiple Ethernet sub-interfaces may be established on the Ethernet interface, and each Ethernet sub-interface may be added into one link-aggregation group, more link-aggregation groups may be established using a smaller number of Ethernet interfaces, so that when the way of dynamic aggregation is adopted, it is possible to use a smaller number of Ethernet interfaces on one device to establish aggregated links with more peer devices, thereby reducing the device's cost.

The above-mentioned are only examples of the present disclosure and are not intended to limit the present application. Any modifications, equivalents, variations and etc., of the present disclosure should be included in the scope protected by the present application.

What is claimed is:

1. A method for dynamic aggregation of links applied to a first device that has first and second Ethernet interfaces, the method comprising:
    establishing first and second Ethernet sub-interfaces on the first Ethernet interface of the first device and first and second Ethernet sub-interfaces on the second Ethernet interface of the first device;
    assigning the first Ethernet sub-interface of the first Ethernet interface and the first Ethernet sub-interface of the second Ethernet interface to a same first Virtual Local Area Network (VLAN) and assign the second Ethernet sub-interface of the first Ethernet interface and the second Ethernet sub-interface of the second Ethernet interface to a same second VLAN, such that the Ethernet sub-interfaces on the same Ethernet interface are assigned to different VLANs;
    adding an Ethernet sub-interface of the first Ethernet interface and an Ethernet sub-interface of the second Ethernet interface which belong to the same VLAN into a link-aggregation group to establish an aggregated link with a second device; and
    for each of the Ethernet sub-interfaces added into the link-aggregation group:
        in response to a determination that the Ethernet sub-interface is in an UP state which is a usable state, setting the Ethernet sub-interface to an INACTIVE state,
        in response to a determination that the Ethernet sub-interface is in the INACTIVE state and a heartbeat packet transmitted by the second device has been received through the Ethernet sub-interface for a predetermined number of successive times, setting the Ethernet sub-interface to an ACTIVE state, and
        in response to a determination that the Ethernet sub-interface is not in the UP state, setting the Ethernet sub-interface to a DOWN state which is an unusable state.

2. The method of claim 1, comprising:
    after the Ethernet sub-interface is set to the INACTIVE state, transmitting the heartbeat packet to the second device through the Ethernet sub-interface at each predetermined time interval, and determining at each predetermined time interval whether the heartbeat packet transmitted by the second device is received through the Ethernet sub-interface within the current time interval.

3. The method of claim 2, further comprising:
    for each Ethernet sub-interface added into the link-aggregation group, when the Ethernet sub-interface is in the ACTIVE state, if the heartbeat packet transmitted by the second device has not been received through the Ethernet sub-interface for N successive times, setting the state of the Ethernet sub-interface as the INACTIVE state, and otherwise keeping the state of the Ethernet sub-interface as the ACTIVE state.

4. The method of claim 2, wherein the heartbeat packet is a Link Aggregation Control Protocol (LACP) packet.

5. The method of claim 2, further comprising:
    when transmitting a data packet to the second device, dependent on relevant information in a packet header of the data packet and using a pre-determined aggregation algorithm, selecting an Ethernet sub-interface from the Ethernet sub-interfaces in the ACTIVE state in the link-aggregation group, to transmit the data packet.

6. A device for dynamic link aggregation that has first and second Ethernet interfaces, comprising: a processor and a non-transitory storage medium coupled to the processor, wherein the non-transitory storage medium stores machine-readable instructions executable by the processor, when the instructions are executed, the processor is to:
    establish first and second Ethernet sub-interfaces on the first Ethernet interface of the device and first and second Ethernet sub-interfaces on the second Ethernet interface of the device;
    assign the first Ethernet sub-interface of the first Ethernet interface and the first Ethernet sub-interface of the second Ethernet interface to a same first Virtual Local Area Network (VLAN) and assign the second Ethernet sub-interface of the first Ethernet interface and the second Ethernet sub-interface of the second Ethernet interface to a same second VLAN, such that the Ethernet sub-interfaces on the same Ethernet interface are assigned to different VLANs;

add an Ethernet sub-interface of the first Ethernet interface and an Ethernet sub-interface of the second Ethernet interface which belong to the same VLAN into a link-aggregation group to establish an aggregated link with a second device; and for each Ethernet sub-interface added into the link-aggregation group:
  in response to a determination that the Ethernet sub-interface is in an UP state which is a usable state, set the Ethernet sub-interface to an INACTIVE state,
  in response to a determination that the Ethernet sub-interface is in the INACTIVE state and a heartbeat packet transmitted by the second device has been received through the Ethernet sub-interface for N successive times, set the Ethernet sub-interface to an ACTIVE state, wherein N is a pre-determined value, and
  in response to a determination that the Ethernet sub-interface is not in the UP state, set the Ethernet sub-interface to an DOWN state which is an unusable state.

7. The device of claim 6,
wherein after the Ethernet sub-interface is set to the INACTIVE state, the processor is to transmit the heartbeat packet to the second device through the Ethernet sub-interface at each pre-determined time interval, and determine at each pre-determined time interval whether the heartbeat packet transmitted by the second device has been received through the Ethernet sub-interface within the current time interval.

8. The device of claim 7, wherein when the instructions are executed, the processor is further to:
  when an Ethernet sub-interface is in the ACTIVE state, if the heartbeat packet transmitted by the second device has not been received through the Ethernet sub-interface for N successive times, set the state of the Ethernet sub-interface as the INACTIVE state, and otherwise keep the state of the Ethernet sub-interface as the ACTIVE state.

9. The device of claim 7, wherein the heartbeat packet is a Link Aggregation Control Protocol (LACP) packet.

10. The device of claim 7, wherein when the instructions are executed, the processor is further to:
  when transmitting a data packet to the second device, dependent on relevant information in a packet header of the data packet and using a pre-determined aggregation algorithm, select an Ethernet sub-interface from the Ethernet sub-interfaces in the ACTIVE state in the link-aggregation group, to transmit the data packet.

11. A non-transitory storage medium storing instructions for execution by a first device that has first and second Ethernet interfaces, wherein the instructions, when executed by the first device, cause the first device to:
  establish first and second Ethernet sub-interfaces on the first Ethernet interface of the device and first and second Ethernet sub-interfaces on the second Ethernet interface of the device,
  assign the first Ethernet sub-interface of the first Ethernet interface and the first Ethernet sub-interface of the second Ethernet interface to a same first Virtual Local Area Network (VLAN) and assign the second Ethernet sub-interface of the first Ethernet interface and the second Ethernet sub-interface of the second Ethernet interface to a same second VLAN, such that the Ethernet sub-interfaces on the same Ethernet interface are assigned to different VLANs,
  adding an Ethernet sub-interface of the first Ethernet interface and an Ethernet sub-interface of the second Ethernet interface which belong to the same VLAN into a link-aggregation group to establish an aggregated link with a second device, and
  for each Ethernet sub-interface added into the link-aggregation group:
    in response to a determination that the Ethernet sub-interface is in an UP state which is a usable state, set the Ethernet sub-interface to an INACTIVE state,
    in response to a determination that the Ethernet sub-interface is in the INACTIVE state and a heartbeat packet transmitted by the second device has been received through the Ethernet sub-interface for N successive times, set the Ethernet sub-interface to an ACTIVE state, wherein N is a pre-determined value, and
    in response to a determination that the Ethernet sub-interface is not in the UP state, set the Ethernet sub-interface to an DOWN state which is an unusable state.

12. The non-transitory storage medium of claim 11,
wherein after the Ethernet sub-interface is set to the INACTIVE state, the instructions cause the first device to transmit the heartbeat packet to the second device through the Ethernet sub-interface at each pre-determined time interval, and determine at each pre-determined time interval whether the heartbeat packet transmitted by the second device is received through the Ethernet sub-interface within the current time interval.

13. The non-transitory storage medium of claim 12,
wherein, for each Ethernet sub-interface added into the link-aggregation group, when the Ethernet sub-interface is in the ACTIVE state, if the heartbeat packet transmitted by the second device has not been received through the Ethernet sub-interface for N successive times, the first device is to set the state of the Ethernet sub-interface as the INACTIVE state, and otherwise keep the state of the Ethernet sub-interface as the ACTIVE state.

14. The non-transitory storage medium of claim 12, wherein the heartbeat packet is a Link Aggregation Control Protocol (LACP) packet.

15. The non-transitory storage medium of claim 12,
wherein, when transmitting a data packet to the second device, dependent on relevant information in a packet header of the data packet and using a pre-determined aggregation algorithm, the first device is to select an Ethernet sub-interface from the Ethernet sub-interfaces in the ACTIVE state in the link-aggregation group, to transmit the data packet.

* * * * *